Dec. 26, 1944.   S. KAHN   2,365,962
PRESSURE GAUGE
Filed Jan. 19, 1942   2 Sheets-Sheet 1

Inventor
Samuel Kahn
by Roberts, Cushman & Woodbury
att'ys.

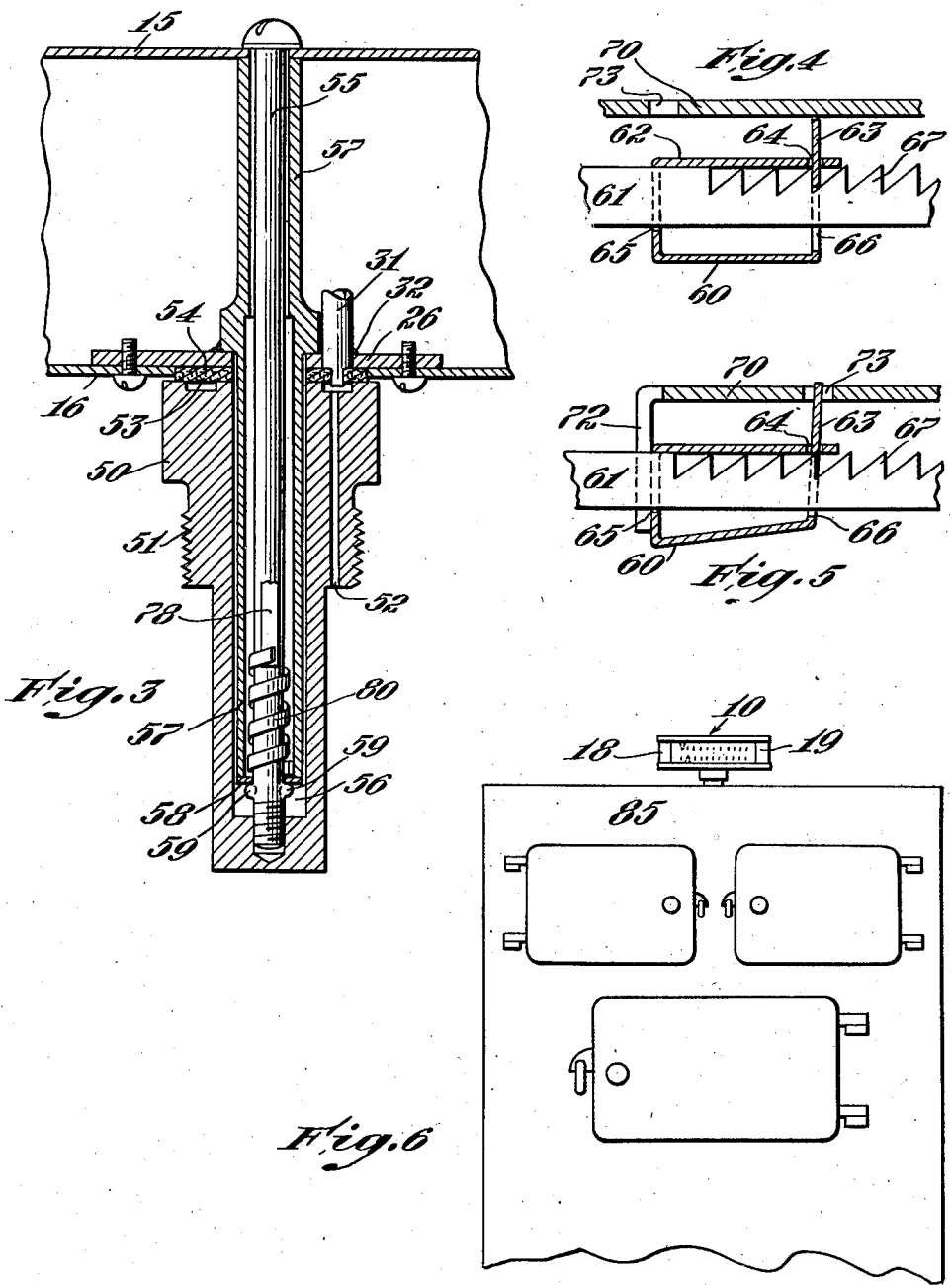

Patented Dec. 26, 1944

2,365,962

UNITED STATES PATENT OFFICE 2,365,962

PRESSURE GAUGE

Samuel Kahn, Bridgeport, Conn., assignor to Manning, Maxwell & Moore, Incorporated, New York, N. Y., a corporation of New Jersey Application January 19, 1942, Serial No. 427,306

9 Claims. (Cl. 73—396)

This invention relates to an improvement in gauges and has as its primary object a gauge by which pressure is indicated.

Another object of this invention is to provide a gauge which may be attached to a boiler in a position at right angles to the connection thereto without subjecting the gauge to any undue and harmful strains.

Another object of this invention is to provide in such a gauge a telltale device which will indicate the occurrence of an overpressure beyond the danger point.

Another object of this invention is to provide in such a gauge a trap in the feed to the Bourdon tube by which liquid is held in the tube, and the entry of steam or other pressure-applying means into the tube is prevented.

These and other objects of the invention will be understood from a consideration of the following description of one embodiment of the invention and of the drawings in which such embodiment is illustrated and in which:

Fig. 3 is a view in cross section illustrating the mounting of such gauge;

Figs. 4 and 5 are detail views illustrating the tell-tale device in two different positions; and Fig. 6 is a view of a boiler equipped with such gauge.

Figure 1:
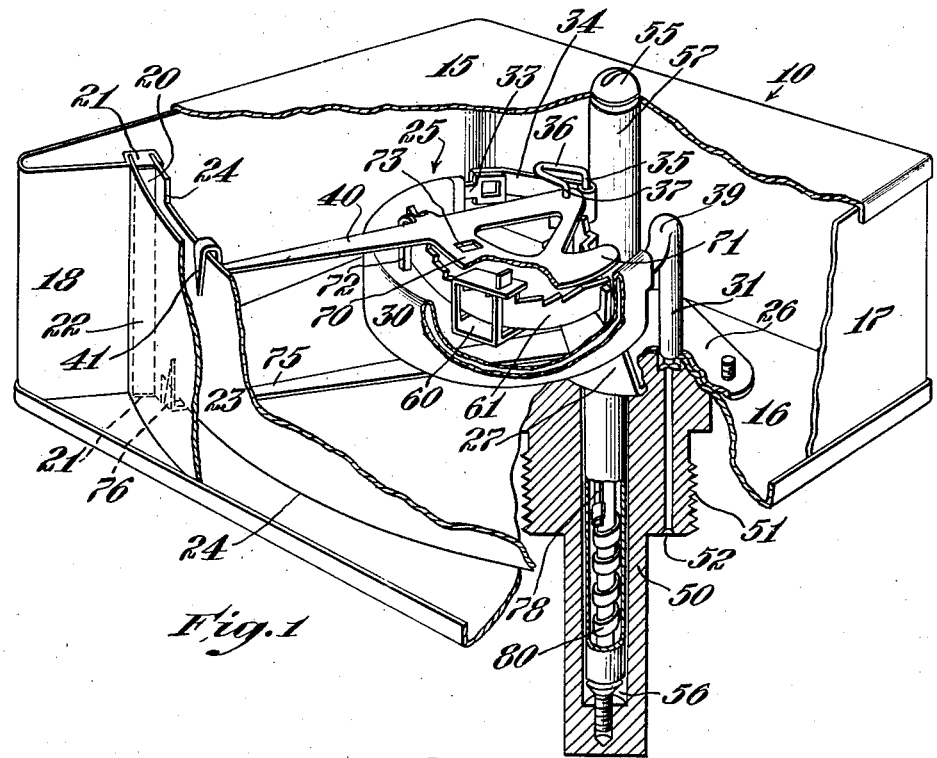
Fig. 1 is a perspective view, with parts broken away, of a gauge embodying this invention.

The gauge 10 comprises a casing having a top plate 15, a bottom plate 16, and walls formed by a continuous strip 17 which encloses the rear and sides of the casing and forms at the front spaced apart walls 18 and 19 (Fig. 6). The front walls 18 and 19 are bent inwardly at acute angles to the side walls and terminate in vertical channels 20 and inturned lugs 21 at the top and bottom of the channels and spaced from the side walls of the channels. Supported in the channels 20 and spaced apart by the lugs 21 are an outer panel 22 of transparent material and a dial 23, said panels being forwardly convex and forming substantially concentric cylindrical arcs. The upper and lower edges of the strip 17 and of the panel 22 bear against the top and bottom plates 15 and 16 and are suitably attached to flanges thereof to close the casing. The upper and lower edges of the dial 23 are cut away intermediate the ends thereof to form slots 24 between the dial and the top and bottom plates.

The pressure-responsive unit 25 within the casing is supported upon a base plate 26 removably attached to the bottom plate 16 and provided with an upright 27 which terminates in a vertical yoke member 28 and an arm 29 at right angles to said member. While the plate 26, upright 27, member 28 and arm 29 are shown in the drawings as integral, they are not necessarily so made. The Bourdon tube 30 is secured at its fixed or stationary end to a conduit 31 (Figs. 1 and 3), the other end of which conduit enters an aperture in the base plate 26 and is fastened thereto by any suitable means, as by soldering or welding at 32 (Fig. 3). The free or movable end of the Bourdon tube is provided with a tip 33 which is secured to one end of a strap or link 34. The other end of the strap 34 is looped to provide a sleeve bearing for a crank-pin element 35 projecting down from and integral with a crank 36 forming part of a length of wire or rod comprising a vertical pivot portion 37 journaled in bearings in the yoke member 28. The part 37 is turned in its bearings by link 34 in response to the movement of the Bourdon tube.

The conduit 31 comprises substantially horizontal and vertical portions joined by an inverted U so as to provide a trap 39 by which the direct entry of hot steam into and the escape of liquid from the tube 30 is prevented.

Rigidly secured to the upper end of part 37 is a pointer 40 which extends outwardly from the unit 25 and, being suitably bent to pass through the slot 24 between the dial 23 and the top plate 15, terminates in a tip 41 which extends downwardly over the upper portion of the dial 23 in front of a row of graduations. The dial 23 is curved about the pivot member 37 as a center so that the pointer 40 will travel along the dial and indicate the amount of pressure exerted on the tube 30.

The gauge 10 is connected to the boiler or other mechanism by an adapter 50 having the usual externally threaded portion 51 by which it is removably secured to the boiler. A passage 52 in the adapter leads to an annular channel 53 which is so arranged that it registers with the conduit 31 regardless of the position of the adapter. A gasket 54 or other suitable packing positioned in an opening in the bottom plate 16 seals the space between the adapter and the base plate 26. The gauge 10 is removably fastened to the adapter 50 by a screw 55 which enters a central well 56 in the adapter and threadedly engages the bottom wall of such well. Surrounding the screw 55 is a sleeve 57. The upper portion of said sleeve bears against the inner faces of the top and bottom plates and serves to hold them a predetermined distance apart while the lower portion of the sleeve enters the well 56. The screw 55 is held against removal from the sleeve by a washer 58 slipped over the lower end of the screw below the bottom of the sleeve. Staked or upset projections 59 on the screw normally prevent removal of the screw and disassembly of the gauge.

Associated with the pointer 40 is a telltale device 60 carried by a curved bar 61 supported rigidly at one end by the member 29. The telltale device 60, which surrounds and is supported by the bar 61, may be of any suitable shape and is here shown rectangular, formed by a suitably bent continuous strap 62 of metal or other resilient material. One end of the strap 62 terminates in a tongue 63 which projects through an aperture 64 in the opposite end. Slots 65, 66 in the opposite side walls of the device receive the bar 61. The upper edge of the bar 61 is provided with teeth 67 which are engaged by the edge of the tongue 63 forming the upper wall of the slot 66 (see Figs. 4 and 5). The tongue 63 rides in the space between two of the teeth. On the bar are marked certain pressure graduations.

The pointer 40 is formed at its base with a segment 70 and a tongue 71 which forms an extension of the segment 70, both segment and tongue being horizontal and extending over the bar 61 and telltale device 60. A vertical forked tab 72 projects down from the pointer 40 and straddles the free end of the bar 61. The segment 70 and tongue 71 are so positioned relative to the device 60 that they normally prevent disengagement of the tongue 63 from the space in which it is set (see Fig. 4). The segment 70, however is provided with an aperture 73 so positioned and formed that when the aperture registers with the tongue 63 the tip of the latter may enter the aperture and the tongue can be disengaged from the teeth 67 of the bar 61 to permit the advance of the device therealong (see Fig. 5).

Temperature is indicated on the dial 23 by a pointer 75 which extends from the sleeve 57 below the pressure-responsive unit 25 and through the slot 24 between the dial 23 and bottom plate 16, and terminates at one end in a tip 76 which is movable along a row of temperature graduations on the dial. The other end portion 78 of the pointer 75 enters through a slot 79 (Fig. 2) in the sleeve 57 into the space between the sleeve 57 and screw 55. Within the sleeve 57 and suitably connected to the pointer 75 is a suitable temperature-responsive element, such as a bi-metallic helix 80 which surrounds the lower portion of the screw 55, being permanently secured at one end to the end 78 of the pointer and at the other end to the inner wall of the sleeve 57 adjacent its lower end. The helix 80, in response to temperature changes within the boiler or other device, will wind or unwind, thus moving the end 78 of the pointer around the axis of screw 55 and causing the tip 76 to travel along the dial 23.

In mounting the gauge upon a boiler 85 the adapter 50 is screwed into the threaded aperture provided for that purpose in the wall of the boiler and then the gauge is attached to the adapter by the screw 55, with the dial 23 facing to the front of the boiler or in any other desired location. The pressure fluid within the boiler enters through the passage 52 and channel 53 and the conduit 31 and deflects the tube 30. This movement of the tube 30 is transmitted through the tip 33, link 34 and rod 36 to the pointer 40, causing the tip 41 thereof to travel along the dial 23.

Figure 2:
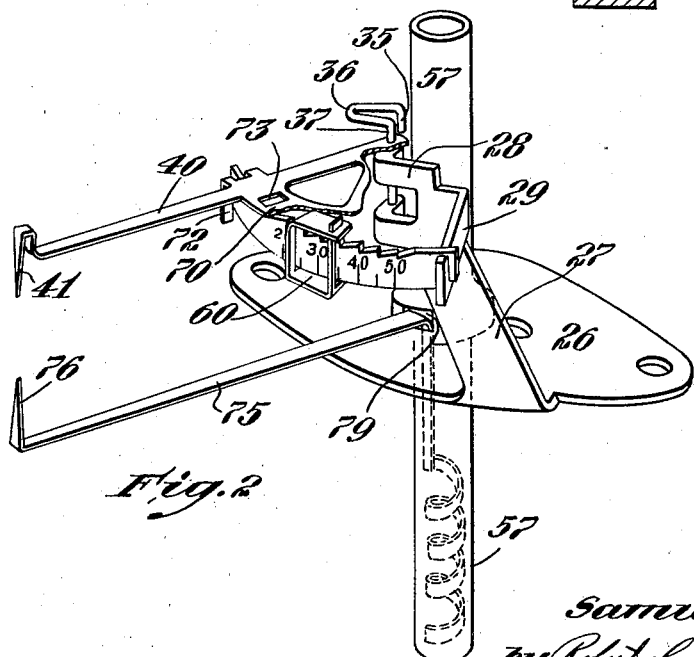
Fig. 2 is a perspective view of certain elements of such gauge.

The telltale device 60 is initially set at any desired point to define the normal upper pressure limit e. g., 35 pounds (see Fig. 2). If the pressure in the boiler reaches such limit the tab 72 on the pointer 40 is brought into contact with the telltale device 60, at which time the aperture 73 in the segment 70 is over the tongue 63 of the device (see Fig. 5). Should the pressure advance beyond that limit, the tab 72 will advance the telltale device 60, the tongue 63 thereof riding up over one or more teeth in the bar 61. When the pressure falls the telltale will remain advanced with its tongue in the space behind the farthest tooth it has reached. Obviously, if, when the pressure starts to fall, the tongue 63 has been partly raised so that it enters the aperture 73, the device will be positively retracted by the pointer until the tongue drops into the nearest space. Inspection of the gauge to determine if an overpressure has taken place can only be made by filing off the projections 59 so that the gauge can be removed from the adapter and disassembled. Thus the device 60 is self-locking and cannot be reset by the user to conceal the fact that an overpressure has occurred without detection.

After the Bourdon tube 30 has been filled with water, oil or other liquid which is held therein by the action of the trap 39 formed in the siphon 31, the hot water or steam from the boiler or the like acts upon such liquid and causes the tube to respond to such pressure. Thus the hot water is prevented from entering the tube so that the latter is unaffected by temperature changes and responds solely to pressure.

One feature of this invention resides in the fact that the pointer 40 controlled by the pressure-responsive unit 25 and the pointer 75 controlled by the temperature-responsive element are independently actuated. These pointers are shown in the drawings as passing over the upper edge of the dial and below the lower edge thereof respectively. However, it will be understood that if desired a single slot or a pair of slots might be provided at the center of the dial through which both pointers might pass, the tips 41 and 76 being then turned upwardly and downwardly respectively.

While one embodiment of this invention has been shown and described, it will be understood that the invention is not limited thereby and that other embodiments thereof may be made without departing from the spirit and scope of the invention as set forth in the following claims.

I claim:

1. A gauge for use on a pressure fluid container, said gauge comprising a casing and an adapter, the casing housing a pressure-responsive element and a pressure-indicating pointer, the adapter having a screw-threaded portion for engagement with a threaded opening in the wall of the container, the adapter having a passage leading therethrough which is always open at one end to the interior of the container, and a pin coaxial with the screw-threaded portion of the adapter for uniting the casing and adapter, the casing being rotatably adjustable about the axis of the pin, and means providing communication between said passage and the pressure-responsive element in all positions of relative adjustment of the casing and adapter.

2. A gauge comprising a casing a pressure-responsive unit including a Bourdon tube and a pointer actuated thereby, a toothed bar rigidly supported in said casing, a telltale device supported on said bar and freely advanceable thereover in one direction only, and a tab carried by said pointer, which tab is brought into contact with the telltale device upon movement of the pointer up to a predtermined pressure limit and acts if the pointer moves beyond such limit to advance the device along the bar.

3. A gauge comprising a casing, a pressure-responsive unit including a Bourdon tube and a pointer actuated thereby, a bar rigidly supported in said casing, said bar being curved concentrically with the path of the pointer, a telltale device supported on said bar and freely advanceable thereover in one direction only, said bar being provided along one edge with teeth and said device including a tongue yieldably held in contact with said teeth the teeth being so formed that they engage the tongue of the device and prevent the movement thereof in one direction while permitting its movement in the opposite direction, and a contact element carried by said pointer, said contact element engaging the telltale device upon movement of the pointer up to a predetermined pressure limit and moving along said bar from its normal position if the pointer moves beyond said limit.

4. In a gauge comprising a casing and a pressure-responsive unit including a Bourdon tube and a pointer actuated thereby, a toothed bar rigidly supported in said casing, a telltale device supported on said bar, a tab carried by said pointer, which tab is brought into contact with the device upon movement of the pointer up to a predetermined pressure limit and acts if the pointer moves beyond such limit to advance the device along the bar, said telltale device including a tongue which, by engagement with a tooth of the bar, normally resists movement of the telltale device along the bar said tongue being disengageable from said tooth to permit the telltale device to advance along the bar, and a guard element carried by the pointer and normally overlying the tongue and of such dimensions as to prevent disengagement of the tongue from said tooth except when the pointer moves beyond said predetermined limit.

5. In a gauge comprising a casing and a pressure-responsive unit including a Bourdon tube and a pointer actuated thereby, a toothed bar rigidly supported in said casing, a telltale device supported on said bar, a tab carried by said pointer, which tab is brought into contact with the device upon movement of the pointer up to a predetermined pressure limit and acts if the pointer moves beyond such limit to advance the telltale device along the bar, said device including a tongue which normally engages a tooth of the bar and thereby resists movement of the telltale device along the bar, the tongue being disengageable from said tooth thereby to permit advance of the telltale device along the bar, and a segment carried by the pointer, said segment normally overlying the tongue to prevent disengagement of the latter from said tooth but having an aperture therein which registers with the tongue when the pointer has moved up to said predetermined limit thereby allowing the tongue to be disengaged from the tooth so that the telltale device may be advanced along the bar.

6. In a gauge comprising a casing and a pressure-responsive unit including a Bourdon tube and a pointer actuated thereby a telltale device, a bar mounted in said casing and on which said device is supported, the upper edge of said bar being serrate, and said device including a tongue yieldably in engagement with the serrate edge and which is normally set on said bar with the tongue between any two adjacent teeth to correspond to a predetermined pressure limit, and means for advancing said device along said bar beyond said setting when the pressure exceeds such limit, said device being held in the advanced position by the coaction of tongue and teeth to indicate such excess of pressure when the pointer is retracted.

7. In combination with a container for fluid, a support mounted thereon and a housing carried by the support, the housing having a sight opening in its wall, the support and housing having opposed parallel surfaces and being capable of relative orientation thereby to permit adjustment of the sight opening to face in any desired direction, the housing containing a movable index visible through the sight opening and an index-operating device responsive to variations in a physical characteristic of a fluid medium, the support having a passage eccentric to the axis of orientation of the housing and designed to communicate with the interior of the container that surface of the support which is opposed to the casing having an annular groove, concentric with the axis of orientation and sealed against communication with the atmosphere, said annular groove communicating with said eccentrically located passage and with the interior of the index-operating device in all positions of adjustment of the housing.

8. In combination with a container for fluid, a pair of parts adjustably connected together, the first of said parts being secured to the container and the second of said parts being capable of orientation relative to the first of said parts, said second part including a hollow casing having a sight opening in one side, a movable index visible through said sight opening, and a pressure-responsive element within the casing for operating the index, one of said respective parts having an annular groove coaxial with the axis of orientation of the second part and which always communicates with the pressure-responsive element, the first of said parts having a passage leading from the interior of the container to said annular groove.

9. In combination with a gauge designed to be associated with a container for pressure fluid, said gauge including a Bourdon tube and a pointer actuated thereby, an adapter by means of which the gauge may be attached to the container, the gauge and adapter having opposed parallel surfaces with packing material interposed between them, the gauge and adapter being adjustably secured together for relative movement in a direction parallel to said surfaces, the adapter having an elongate groove in its said surface which is closed by the gauge and packing material thereby to provide an elongate fluid-tight conduit, the adapter having a passage which leads from the conduit to the exterior of the adapter and terminates at such a point as to communicate with the interior of the pressure fluid container on which the adapter may be mounted, the gauge also including a siphon which is always in open communication at one end with the Bourdon tube, the gauge having an aperture in that wall which forms its aforesaid surface, the aperture being located so that it registers with the aforesaid conduit whatever the relative position of the gauge and adapter, the other end of the siphon registering with the aperture.

SAMUEL KAHN.